United States Patent [19]

Jacob

[11] 4,311,734
[45] Jan. 19, 1982

[54] POROMERIC SHEET MATERIAL WITH DEPOROMERIZED AREAS

[76] Inventor: Ezekiel J. Jacob, 25 Monroe Pl., Brooklyn, N.Y. 11201

[21] Appl. No.: 933,543

[22] Filed: Aug. 14, 1978

[51] Int. Cl.³ .......................... A43B 23/00; B05D 3/02; B05D 3/12; B05D 5/00
[52] U.S. Cl. ................................... 427/245; 36/46.5; 427/370; 427/393.4; 428/240; 428/262; 428/290
[58] Field of Search ................... 427/245, 370, 385 B, 427/393.4; 428/290, 240, 262; 36/46.5

[56] References Cited

U.S. PATENT DOCUMENTS

| | | | |
|---|---|---|---|
| 3,034,927 | 5/1962 | Fairclough et al. | 427/245 |
| 3,143,436 | 8/1964 | Dosmann | 427/245 |
| 3,353,981 | 11/1967 | Jacob | 428/262 X |
| 3,418,198 | 12/1968 | Einstman | 427/245 X |
| 3,546,001 | 12/1970 | Giannone et al. | 427/245 |
| 3,718,561 | 2/1973 | Jacob | 204/130 X |

Primary Examiner—Michael R. Lusignan

[57] ABSTRACT

A poromeric sheet material is provided with deporomerized areas selectively disposed at points where better mechanical strength is desired and where in addition better hydrostatic resistance is desired. Better mechanical strength means better abrasion resistance, better puncture resistance, better flex life. Better hydrostatic resistance means resistance to wetting-through, resistance to bibulousness, resistance to the passage of water-borne soiling agents. The deporomerized areas of the poromeric sheet material preferably are disposed in the areas where, for instance, a shoe upper made from the material is joined to the shoe sole, where the greatest flex-life is desired and where the greater waterproofness is desired. Other poromeric articles such as wearing apparel, upholstery and the like may be similarly provided with deporomerized areas selectively disposed in areas where better mechanical properties and better waterproofness may be desired.

9 Claims, 3 Drawing Figures

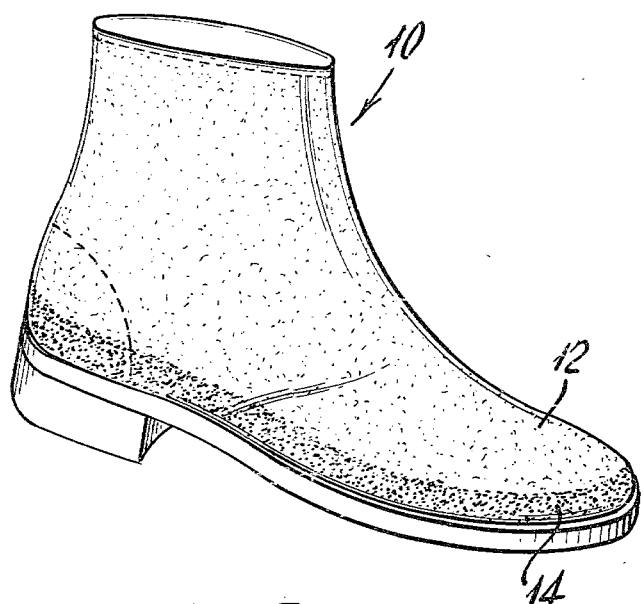
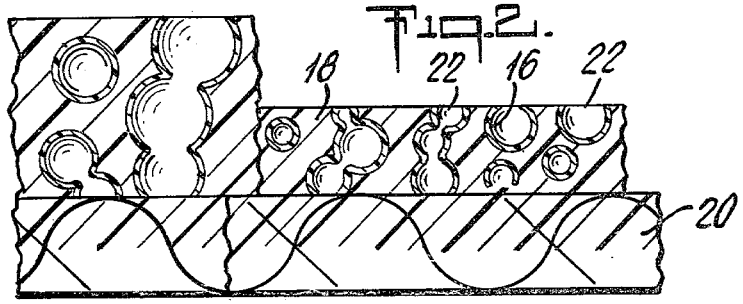
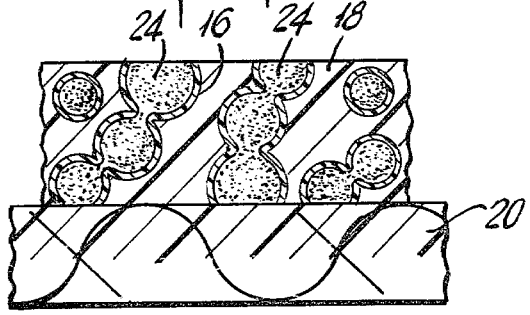

POROMERIC SHEET MATERIAL WITH DEPOROMERIZED AREAS

BACKGROUND OF THE INVENTION

Poromeric (poroplastic) articles are made with microporous sheet material such as "CORFAM" of the E. I. duPont Company, "AZTRAN" of the B. F. Goodrich Company, "GENAIRE" of the General Tire Company, "XYLEE" from West Germany and "CLARINO" from Japan. The microporous poromeric sheet material may be made in a variety of ways, and with a variety of polymers, notably polyvinylchloride and polyurethane. None of these methods is sufficiently known in the art because of the fact that published patents and literature either do not disclose enough, or are lacking, or are shrouded in trade secrecy. In each case where an article of raiment, notably shoes, was fabricated from such poromeric sheet material, a compromise had to be made between comfort and mechanical strength. These compromises proved to be incorrect and the first four poromerics mentioned above were withdrawn from the market at a loss estimated at over 200 million dollars.

One of the contributing factors to the commercial demise of the duPont material for shoes was leakage at the seams particularly at the juncture of the upper and the sole. (See *Chemistry and Industry*, Dec. 10, 1966, page 2084).

However, two methods of manufacturing poromeric sheet material are clearly known, one method being described in U.S. Pat. No. 3,353,981 and the other method in U.S. Pat. No. 3,718,561. The present invention is an improvement on the latter inventions.

The problem which the present invention has solved, is the problem of comfort versus mechanical strength, by providing both, instead of one at the expense of the other. Both attributes co-exist in the sheet material of the present invention. Comfort is provided where needed, and this is generally for the largest part of the area of the poromeric article, and mechanical strength is provided where needed, and this is generally in the area where the greatest flex-life is desired such as the welt-area of a shoe where the upper is attached to the sole.

In outerwear the area of mechanical strength and maximum waterproofness is provided near the shoulder sections. In upholstery the area of mechanical strength is provided at the seaming sections and also at the edge portions of seats where maximum abrasive wear takes place. Thus according to my invention microporosity is retained for maximum comfort, breathability, and moisture vapor transmission yet flex-life, abrasion resistance, stitch-strength, are provided in the relatively minor areas of the microporous article where these functional attributes are necessary.

Thus a poromeric article which is torn between the Scylla and Charybdis of comfort versus mechanical strength, is now possible to manufacture having both comfort and mechanical strength, exactly as and where needed, by the process of de-poromerizing the material in desired areas. The de-poromerizing areas have the near-maximum mechanical properties of a solid mass which has not been attenuated by micro-pores therein.

BRIEF SUMMARY OF THE INVENTION

The present invention involves a method of de-poromerizing preselected areas of a poromeric sheet material to render such areas substantially impermeable to moisture and water. The deporomerization is achieved by densification of the material, i.e., elimination or substantial decrease in porosity, by mechanical or chemical methods. The mechanical method comprises the application of heat, pressure or both and the chemical method comprises incorporating in the pores of the area to be densified a polymerizable plastic material compatible with the sheet material and then polymerizing the thus incorporated material.

DESCRIPTION OF THE DRAWINGS

FIG. 1 is an isometric schematic of a shoe made with the material of the present invention;

FIG. 2 is an enlarged vertical fragmentary section through untreated and densified poromeric sheet material; and FIG. 3 is an enlarged vertical fragmentary section of chemically deporomerized poromeric sheet material.

DESCRIPTION OF THE PREFERRED EMBODIMENTS

A poromeric fabric is cut into shapes for wearing apparel, shoe uppers, upholstery panels and the like. These shapes are marked off as to the areas of attachment, areas of desired greater waterproofness, areas of desired functional mechanical stress, etc. These marked areas are then de-poromerized. De-poromerized areas are created by densification resultant upon the application of heat, pressure, or both. Densification closes the micropores to any desired degree, simultaneously achieving greater mechanical strength. As the micropores close, the comfort factor progressively decreases as measured by moisture vapor transmission and air permeability tests.

Thus if a micropore is closed down to less than two microns, liquid water will not go through. If it is closed down to one half a micron bacteria will not go through. If it closed down to one tenth of a micron then most solid particles including some viruses will not go through. At the latter degree of de-poromerization, maximum mechanical strength is achieved, and consequently, a greater degree of waterproofness. At such degree of de-poromerization also there will still remain some moisture-vapor transmission in the de-poromerized section, but it will be diminished considerably to a vestigial quantity, which is not normally considered adequate for human comfort overall. The human comfort is provided by the relatively large numbers of micropores of 2 microns and larger provided in the main body of the poromeric article. The difference of physical properties in the poromeric material and in the deporomerized sections thereof are summarized below.

The basic poromeric material is polyvinyl chloride on a fabric substrate produced according to Jacob U.S. Pat. No. 3,353,981 at a weight per square yard of 13.4 ounces.

POROMERIC MATERIAL

Moisture vapor transmission: 17 grams per hour per square meter over 7 days
Density: 42.5 lbs./cubic foot
Water Absorption: 42% weight increase
Bally Flex: 200,000 in each direction

DEPOROMERIZED SECTIONS

The de-poromerization can be achieved by radio-frequency heating at a temperature of 250° or 280°–480° F.

and pressure of 150 to 20 pounds per square inch, or by hot-stamping with a hot die at substantially the same temperature and pressure.

Moisture vapor transmission: 2 grams per hour per square meter over 7 days
Density: 82 lbs./cubic foot
Water Absorption: zero
Bally Flex: over one million in each direction De-poromerization may also be carried out by saturating the micropores with a liquid monomer such as isobutyl methacrylate containing a catalyst, namely about 1% benzoyl peroxide and polymerizing with slight heat (e.g., 200° F.). This gives the most complete saturating or filling action on the micropores. Saturating with higher viscosity lattices, emulsions or solutions would not produce complete de-poromerization, but a degree of de-poromerization which would be satisfactory to function for most applications. The cost advantage lies with the heat/pressure method of selective de-poromerization.

FIG. 1 shows a poromeric shoe 10 with deporomerized area 14, said deporomerization being effected in the poromeric material 12 at the area of attachment to the shoe sole. Area 14 densified according to the methods of the present invention has waterproofness so that the wearer can stand in water without getting the feet wet. It has the greatest flex-life possible consistent with the formulation, be it polyvinyl chloride or polyurethane or any other synthetic polymer. In effect area 14 is a solid polymeric coating having twice the bulk density of the poromeric section 12, and has almost the theoretical bulk-density of the plastic material devoid of the micropores that make it poromeric.

Area 12, which has the moisture vapor transmission and air permeability properties comprises the greatest portion of the surface area of the poromeric shoe. The shoe is more comfortable to wear than any poromeric shoe that was on the market heretofore, yet inspite of its attenuated mass in area 12, the densified mass of the deporomerized section 14 in the functional area makes the shoe of the invention as long lasting and functionally desirable as any solid-coated non-breathable shoe upper material.

FIG. 2 is a cross-sectional view of the coated fabric 20 of microporosity having poromeric and also deporomerized areas. The full thickness cross-section on the left is the poromeric material of U.S. Pat. No. 3,353,981, and the half-thickness section on the right is the deporomerized section. Referring to FIG. 1, this is the area where the microporous poromeric upper material 12 is converted into the deporomerized area 14. The polyvinyl chloride (plastic) matrix 18 has embedded within it the microspheres 16 which create the micropores and the ruptured microspheres 22 which are also the poromerizing instrumentalities. In this deporomerized area the poromeric shoe upper has been compressed and permanently deformed into half its thickness resulting in micropores which are now less than two microns in size and will not permit the passage of liquid water.

The microspheres 16 and the ruptured microspheres 22 may be single microspheres as in U.S. Pat. No. 3,353,981 or as clustered microspheres in solid particulate domains. The clustered microspheres in solid particulate domains are used to make a poromeric breathable article according to my co-pending application filed contemporaneously herewith, based upon disclosure document Ser. No. 71,468 filed on May 23, 1978 and entitled "Microporous Coated Fabrics From Clustered Microspheres". During deporomerization, the microsphere clusters migrate towards one another as their domains move towards each other during compression. There will then occur either a rupturing of the microspheres in each cluster or the narrowing down of the interstitial spaces between the domains and between the microspherical and hemi-microspherical particles on the exposed surfaces of one domain relative to an adjacent domain.

FIG. 3 shows the poromeric shoe upper material 20 having a microporous coating thereon, consisting of the polyvinyl chloride (plastic) matrix holding the microspheres 16 and the interconnecting passageways 24 therebetween and therethrough. The passageways and the micropores are filled with a solid plastic material 24 deposited initially as a liquid and solidified in situ. The micropores have been defunctionalized by the deposited solid material and the poromeric material thus deporomerized will not permit the passage of liquid water, through the deporomerized areas.

The following may be mentioned as examples but not as restrictions on the scope of this invention:

1. A poromeric garment suitable for rainwear, where the areas near the shoulders are selectively deporomerized to provide resistance to heavy rain and storm.

2. Tent material similarly deporomerized at the areas of attachment to grommets, at the roof and at the seams.

3. Upholstery panels such as upholstery in the bucket seats of automobiles, where selective deporomerization is done at the extremities and the edge sections to provide greater resistance to abrasive wear and puncturing.

4. Filter media and colony counting membranes where the center portion of the filter panel is left in poromeric condition say in squares of one inch, and all the outside section is deporomerized.

5. All articles of raiment where the greatest comfort, moisture vapor transmission, air permeability are desired in the largest portion of the area covered, and where functionality of mechanical strength, flex-life, abrasion resistance are desired.

While certain embodiments of the invention have been shown and described herein, it is to be understood that changes and additions may be made by those skilled in the art without departing from the scope and spirit of the invention.

What is claimed is:

1. The method of deporomerizing a selected area of a microporous poromeric material comprised of a plastic matrix which includes micropores to render said selected area substantially waterproof and to increase the mechanical strength thereof while retaining the porosity of the other areas of said material comprising the step of densifying the micropores within said selected area by heating said area to a temperature of about 250° F. to about 480° F. to render it pliable and subjecting said pliable area to mechanical compression of about 20 to 150 psi, whereby the micropores within said select area are substantially eliminated.

2. The method of selectively densifying areas of a poromeric sheet material comprised of a plastic matrix containing micropores throughout said plastic matrix each of a size greater than about 2 microns to provide one or more water impervious areas therein adjacent to one or more existing water penetrable poromeric areas therein comprising subjecting those areas to be densified to heat of about 250° F. to about 480° F. to render said area pliable and mechanical compression of about 20 to about 150 psi, to reduce the size of the micropores therein to about 1 micron.

3. The method of preparing an article from a microporous poromeric material, which comprises the steps of:
   a. deporomerizing selected areas of a microporous material to render said selected areas waterproof and to increase the mechanical strength thereof while retaining the porosity of the other areas of said material by subjecting the micropores within said select areas to a densification step to substantially eliminate said micropores, and wherein said select areas are densified by heating them to a temperature of about 250° F. to about 480° F. to render them pliable and subjecting said pliable areas to mechanical compression of about 20 to 150 psi, whereby the micropores within said select areas are substantially eliminated; and
   b. forming the areas of said article wherein mechanical strength and water impermeability are desired from said select areas and forming the areas of said article wherein porosity is desired from said porous area of said microporous material.

4. The method according to claims 1 or 2 or 3 wherein said microporous poromeric material is heated to a temperature of from about 280° F. to about 480° F.

5. The method according to claim 4 wherein said micropores are formed by single microspheres or clusters of microspheres in a solid particulate domain.

6. The method according to claim 5 wherein said plastic matrix is comprised of polyurethane or polyvinyl chloride.

7. In the method of claim 2 said plastic matrix is comprised of polyvinyl chloride, said temperature being about 250° F. and said pressure being about 25 psi.

8. The method according to claims 1 or 3 wherein said micropores are formed from single microspheres or clusters of microspheres in a solid particulate domain.

9. The method according to claims 1 or 3 wherein said plastic matrix is comprised of polyvinyl chloride.

* * * * *